(12) United States Patent
Huang

(10) Patent No.: US 7,337,675 B2
(45) Date of Patent: Mar. 4, 2008

(54) METHOD FOR MEASURING AVERAGE VELOCITY PRESSURE AND SYSTEM THEREOF

(75) Inventor: Chien-Ping Huang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 117 days.

(21) Appl. No.: 11/172,798

(22) Filed: Jul. 5, 2005

(65) Prior Publication Data

US 2006/0117858 A1 Jun. 8, 2006

(30) Foreign Application Priority Data

Dec. 6, 2004 (TW) ............................... 93137610 A

(51) Int. Cl.
*G01L 15/00* (2006.01)
(52) U.S. Cl. ................. 73/736; 73/715; 73/727; 73/754
(58) Field of Classification Search ............. 73/736, 73/715–727, 754
See application file for complete search history.

(56) References Cited

U.S. PATENT DOCUMENTS

| 3,530,719 | A | * | 9/1970 | Altfillisch | 73/735 |
| 3,831,448 | A | * | 8/1974 | Kors et al. | 73/861.65 |
| 4,099,164 | A | * | 7/1978 | Sidor et al. | 340/870.33 |
| 5,138,886 | A | * | 8/1992 | Tilley, Sr. | 73/749 |
| 5,814,004 | A | * | 9/1998 | Tamari | 604/6.1 |
| 6,688,182 | B2 | * | 2/2004 | Kurtz et al. | 73/727 |
| 6,928,884 | B1 | * | 8/2005 | Pearson | 73/861.42 |
| 7,007,740 | B2 | * | 3/2006 | Grinbergs et al. | 165/11.1 |
| 7,036,559 | B2 | * | 5/2006 | Stanimirovic | 165/11.1 |
| 7,055,332 | B2 | * | 6/2006 | Poese et al. | 62/6 |
| 7,089,790 | B2 | * | 8/2006 | Silverbrook et al. | 73/146 |
| 7,134,346 | B2 | * | 11/2006 | Lopushansky et al. | 73/716 |
| 2006/0230837 | A1 | * | 10/2006 | Wilson | 73/736 |

FOREIGN PATENT DOCUMENTS

TW    517840 A    1/2003

\* cited by examiner

*Primary Examiner*—Edward Lefkowitz
*Assistant Examiner*—Freddie Kirkland, III
(74) *Attorney, Agent, or Firm*—Birch, Stewart, Kolasch & Birch, LLP

(57) ABSTRACT

A method for measuring average velocity pressure of a stack comprises the following steps. First, a total pressure measuring device is provided. The total pressure measuring device then measures the total pressure at a first location in the stack. Next, physical parameters comprising a distance between the first location and an outlet of the stack, a diameter and shape thereof are obtained. A formula of a static pressure and the average velocity pressure between the outlet and the first location is obtained by comparing the physical parameters to known fluid mechanics data. Finally, the average velocity pressure is obtained from the formula and the total pressure.

21 Claims, 6 Drawing Sheets

METHOD FOR MEASURING AVERAGE VELOCITY PRESSURE AND SYSTEM THEREOF

BACKGROUND

The invention relates to a method for measuring an average velocity pressure of a pipe, and more particularly to a method for measuring an average velocity pressure of a stack.

With reference to FIG. 1, conventional method for measuring an average velocity pressure, such as Taiwan Patent No. 517840, comprises: forming two openings on a pipe, obtaining a total pressure and a static pressure in a pipe separately through a total pressure detecting tube 321 and a static pressure detecting tube 322 passing the openings, and obtaining the average velocity pressure by subtracting the static pressure from the total pressure.

When the pipe transmits corrosive gas, the inner wall thereof must be subject to a corrosion-resistant process. The cost of the corrosion-resistant process, however, increases with the number of the openings. Additionally, the openings decrease the structural integrity and life of the pipe.

SUMMARY

An embodiment of a method for measuring average velocity pressure of a stack comprises the following steps. First, a total pressure measuring device is provided. The total pressure measuring device then measures the total pressure at a first location in the stack. Next, physical parameters comprising a distance between the first location and an outlet of the stack, a diameter and shape thereof are obtained. A formula of a static pressure and the average velocity pressure between the outlet and the first location is obtained by comparing the physical parameters to known historic fluid mechanics data. Finally, the average velocity pressure is obtained from the formula and the total pressure.

The invention disposes only one opening on the pipe to measure the total pressure. Thus, the cost of the corrosion-resistant process is reduced, and the strength and life of the pipe are increased. The invention removes the static pressure tube and further decreases the cost of the measurement system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only and thus are not limitative of the present invention.

DETAILED DESCRIPTION

The invention measures average velocity pressure of a pipe which has a simpler shape and an outlet, such as stack. The invention measures a total pressure, obtains a formula for static pressure drop and average velocity pressure between a first location and the outlet according to physical parameters, and obtains the average velocity pressure through the formula and the total pressure.

First Embodiment

Figure 1:
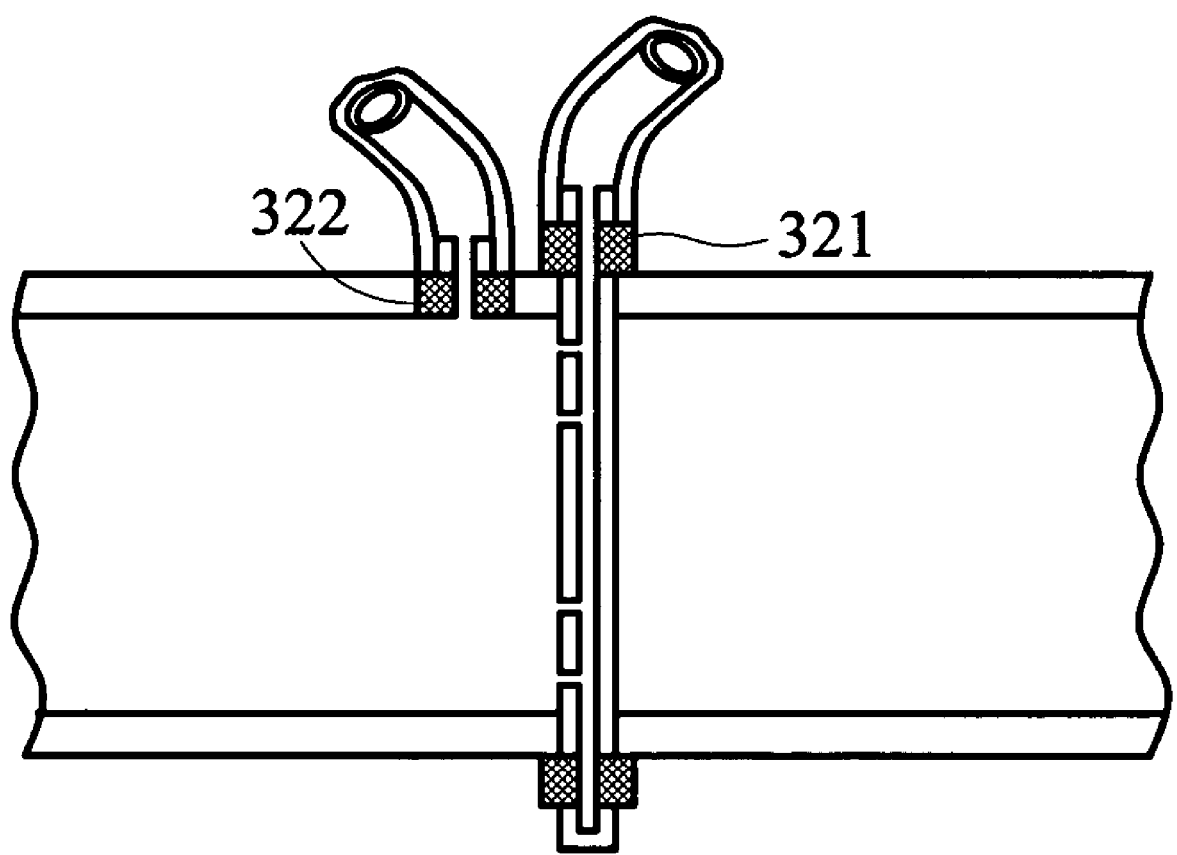
FIG. 1 shows a conventional pressure measuring device for measuring an average velocity pressure of a pipe.
Figure 2A:
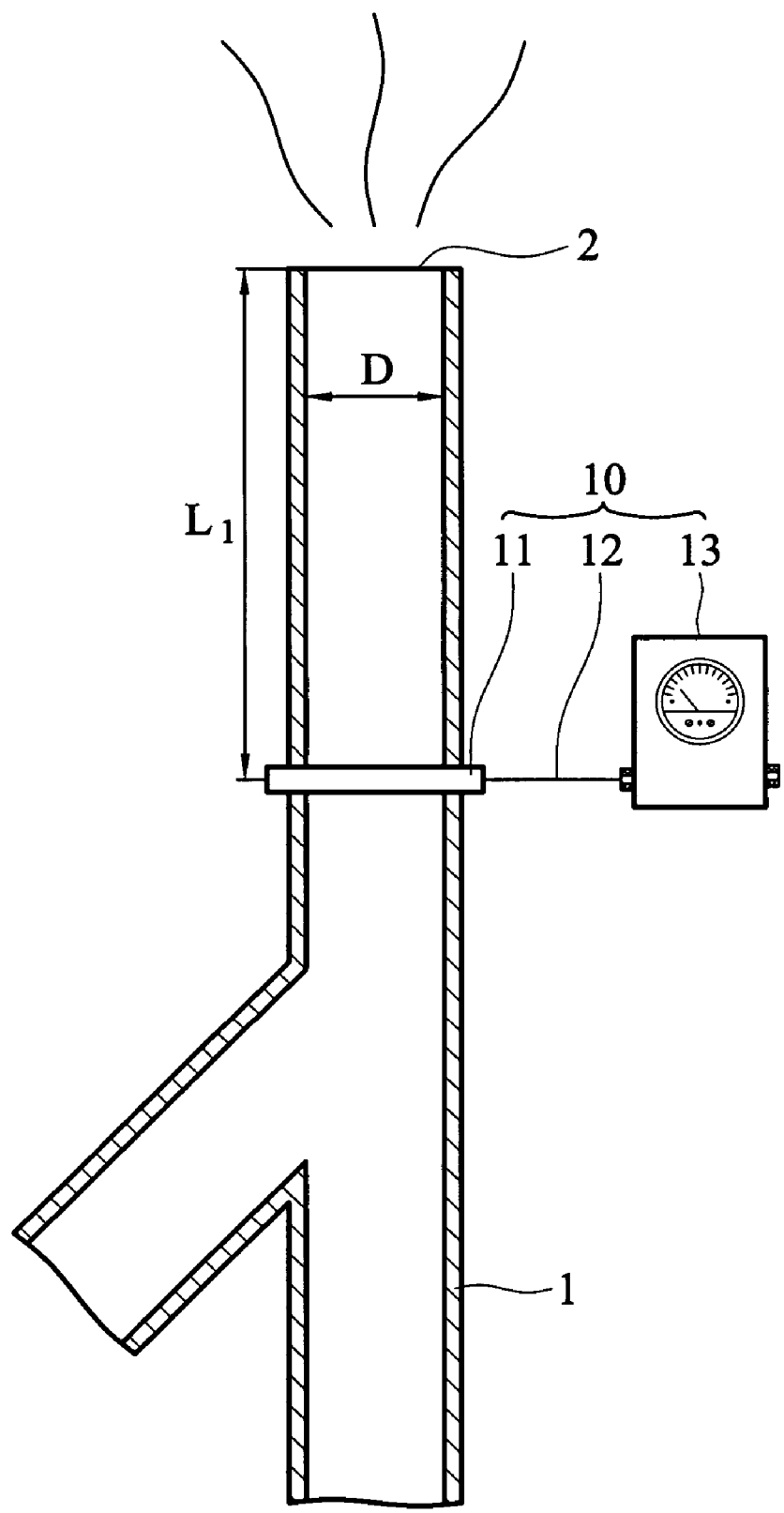
FIG. 2a shows a pipe to be measured in a first embodiment of the invention.

In the first embodiment, the invention measures the average velocity pressure in a straight circular pipe (in the following description, the "pipe" means a sectional pipe to be detected). FIG. 2a shows a stack (pipe) 1 and a total pressure measuring device 10. The total pressure measuring device 10 measures a total pressure at a first location in the stack 1.

Figure 2B:
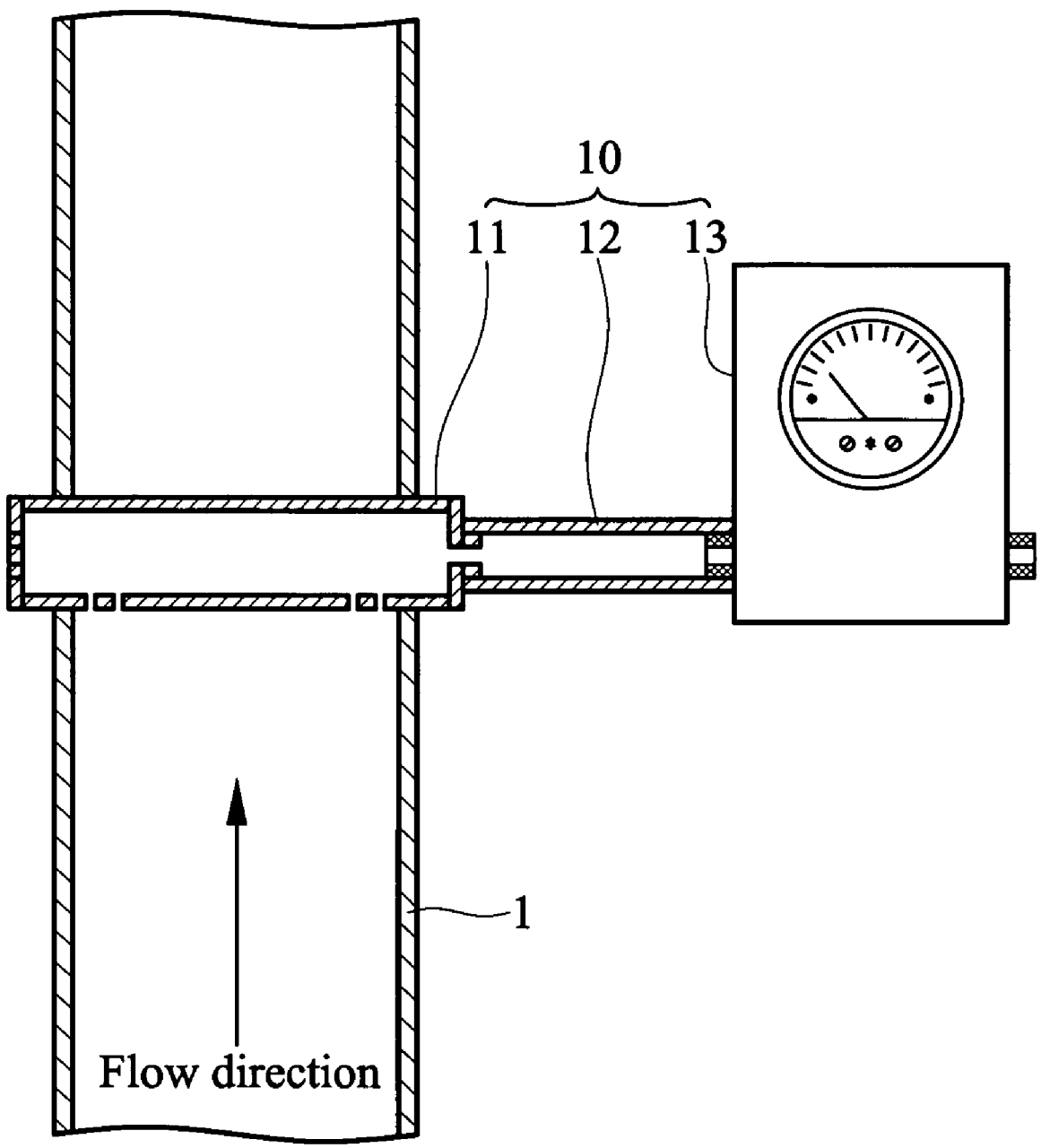
FIG. 2b shows a detailed structure of a total pressure measuring device.

FIG. 2b shows the detailed structure of the total pressure measuring device 10, which comprises a total pressure tube 11, a soft tube 12 and a manometer 13. The total pressure tube 11 faces a flow direction (as shown by the arrow in FIG. 2b) of the gas in the pipe 1. The soft tube 12 is connected between the total pressure tube 11 and the manometer 13. The manometer 13 obtains the total pressure by subtracting a measured pressure from an atmospheric pressure, wherein the measured pressure is obtained through the total pressure tube 11.

The measurement method of the invention is described hereafter.

Figure 3:
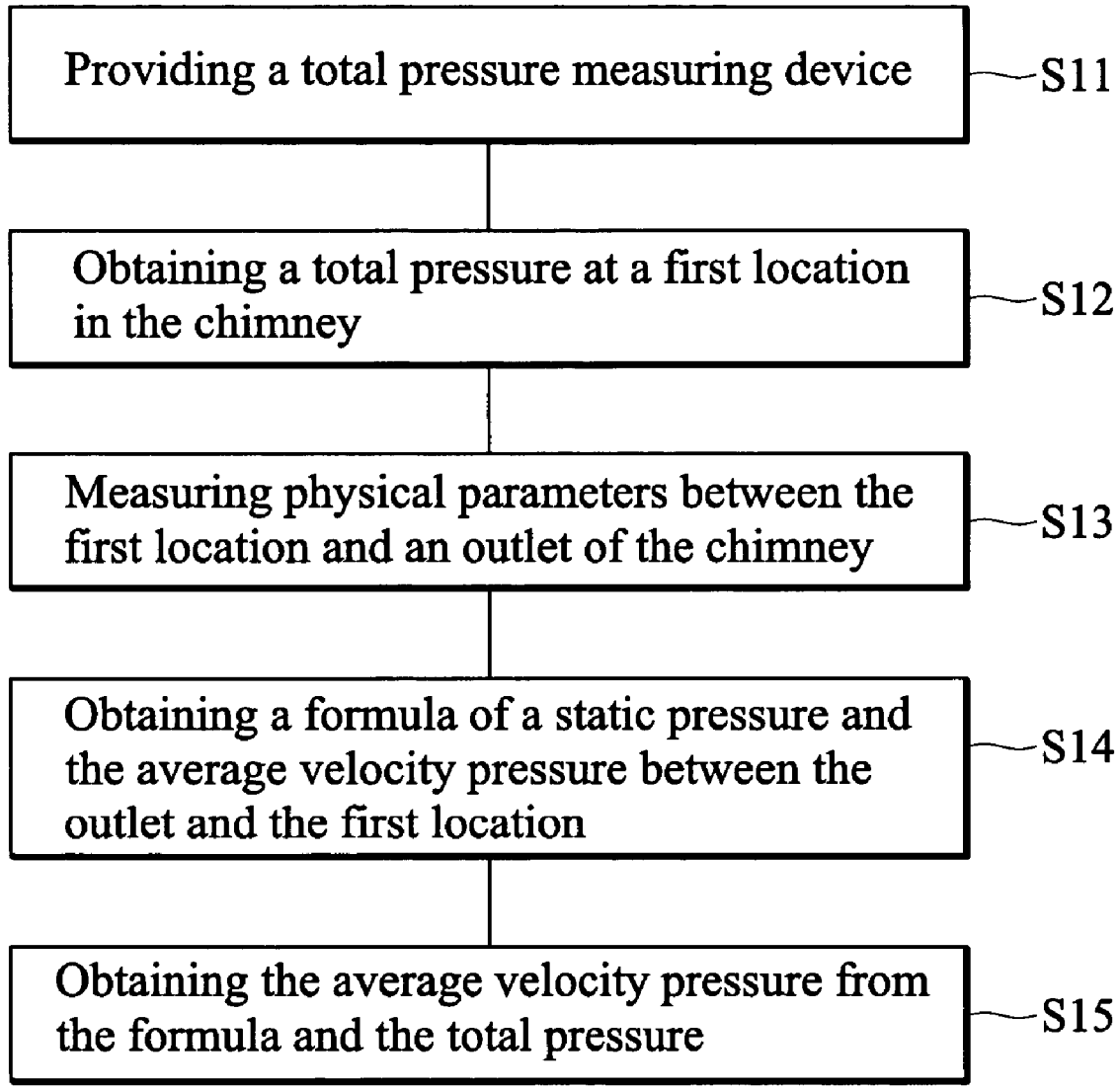
FIG. 3 shows the steps of the measurement method of the invention.

With reference to FIGS. 2a and 3, first, the total pressure measuring device 10 is provided (S11). The total pressure measuring device 10 then measures the total pressure at a first location in the stack 1 (S12). Next, physical parameters comprising a distance $L_1$ between the first location and an outlet 2 of the stack, a diameter D and shape thereof are obtained (S13). A formula of a static pressure and the average velocity pressure between the outlet 2 and the first location is obtained by comparing the physical parameters to known fluid mechanics data (S14). Finally, the average velocity pressure is obtained from the formula and the total pressure (S15).

According to known fluid mechanics data, the formula of the static pressure drop and the average velocity pressure of a straight pipe is equivalent to a first formula:

$$\Delta SP \approx C_1 \times \frac{L_1}{D^{C_2}} \times VP \quad (1)$$

wherein, $\Delta SP$ is the static pressure drop, $VP$ is the average velocity pressure, $L_1$ is the distance between the first location and the outlet, D is the diameter of the pipe, $C_1$ and $C_2$ are constants obtained by comparing the physical parameters to known fluid mechanics data, such as Industrial Ventilation—A manual of Recommended Practice published by ACGIH. Thus, the relationship between the average velocity pressure and the static pressure drop is obtained from the first formula and the known parameters $L_1$, D, $C_1$, and $C_2$.

The outlet 2 is connected to the atmosphere, and the static pressure thereat is 0. The static pressure SP at the first location therefore equals static pressure drop $\Delta SP$ between the first location and the outlet 2 (SP=$\Delta SP$).

Then, the first formula is incorporated into a second formula:

$$VP = TP - SP \quad (2)$$

wherein, TP is total pressure measured by the total pressure measuring device 10. Next, a fourth formula is obtained:

$$VP \approx \left[\frac{1}{1 + C_1 \times L_1 / D^{C_2}}\right] \times TP \quad (4)$$

Thus, the average velocity pressure VP is obtained.

Second Embodiment

Figure 4:
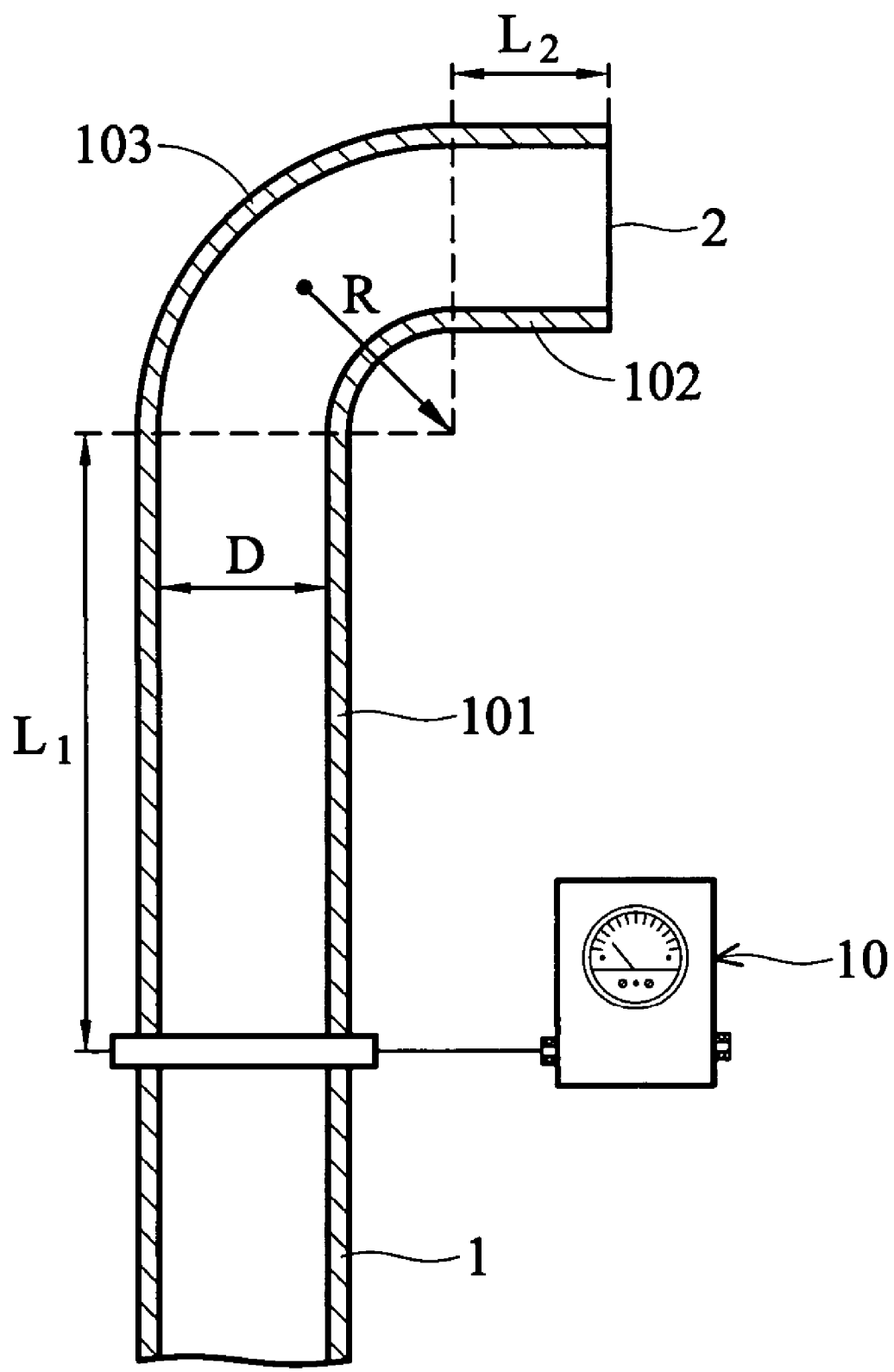
FIG. 4 shows a pipe to be measured in a second embodiment of the invention.

In the second embodiment, the invention measures the average velocity pressure in an L-shaped circular pipe. As shown in FIG. 4, the stack 1 comprises a first straight portion 101, a second straight portion 102 and an elbow portion 103. The length of the first straight portion 101 is $L_1$, the length of the second straight portion 102 is $L_2$, and the curvature radius of the elbow portion 103 is R.

The second embodiment differs from the first embodiment in the formula obtained from known fluid mechanics data equivalent to a third formula:

$$\Delta SP \approx K \times VP + C_1 \times \frac{L_1 + L_2}{D^{C_2}} \times VP \quad (3)$$

wherein, $\Delta SP$ is the static pressure drop, VP is the average velocity pressure, $L_1$ is the length of the first straight portion, $L_2$ is the length of the second straight portion, D is the diameter of the stack 1 (pipe), $C_1$, $C_2$, and K are constants obtained by comparing the physical parameters to an known fluid mechanics data, such as Industrial Ventilation—A manual of Recommended Practice published by ACGIH. Thus, the relationship between the average velocity pressure and the static pressure drop is obtained from the third formula and the known parameters $L_1$, $L_2$, D, K, $C_1$, and $C_2$.

The outlet 2 is connected to the atmosphere, and the static pressure thereat is 0. The static pressure SP at the first location therefore equals static pressure drop $\Delta SP$ between the first location and the outlet 2 (SP=$\Delta SP$).

Then, the fourth formula is incorporated into a second formula:

$$VP = TP - SP \quad (2)$$

wherein, TP is total pressure measured by the total pressure measuring device 10. Next, a fifth formula is obtained:

$$VP \approx \left[\frac{1}{1 + K + C_1 \times (L_1 + L_2) / D^{C_2}}\right] \times TP \quad (5)$$

Thus, the average velocity pressure VP is obtained.

The invention disposes only one opening on the pipe to measure the total pressure. Thus, the cost of the corrosion-resistant process is reduced, and pipe strength and life is increased. The invention removes the static pressure tube and further decreases the cost of the measurement system.

Figure 5:
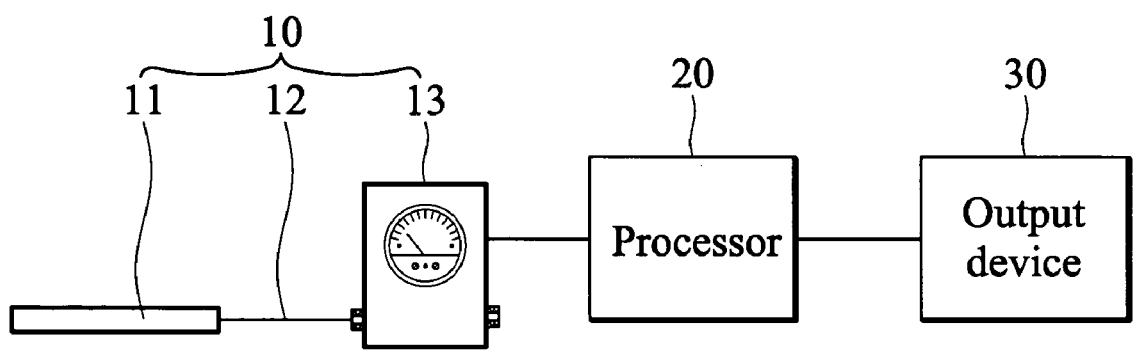
FIG. 5 shows a pressure measuring system of the invention.

FIG. 5 shows the average pressure measuring system of the invention, which comprises a total pressure measuring device 10, a processor 20 and an output device 30. The processor 20 obtains the average velocity pressure from the measurement method mentioned above. The output device 30 is coupled to the processor 20 outputting the average velocity pressure.

Figure 6:
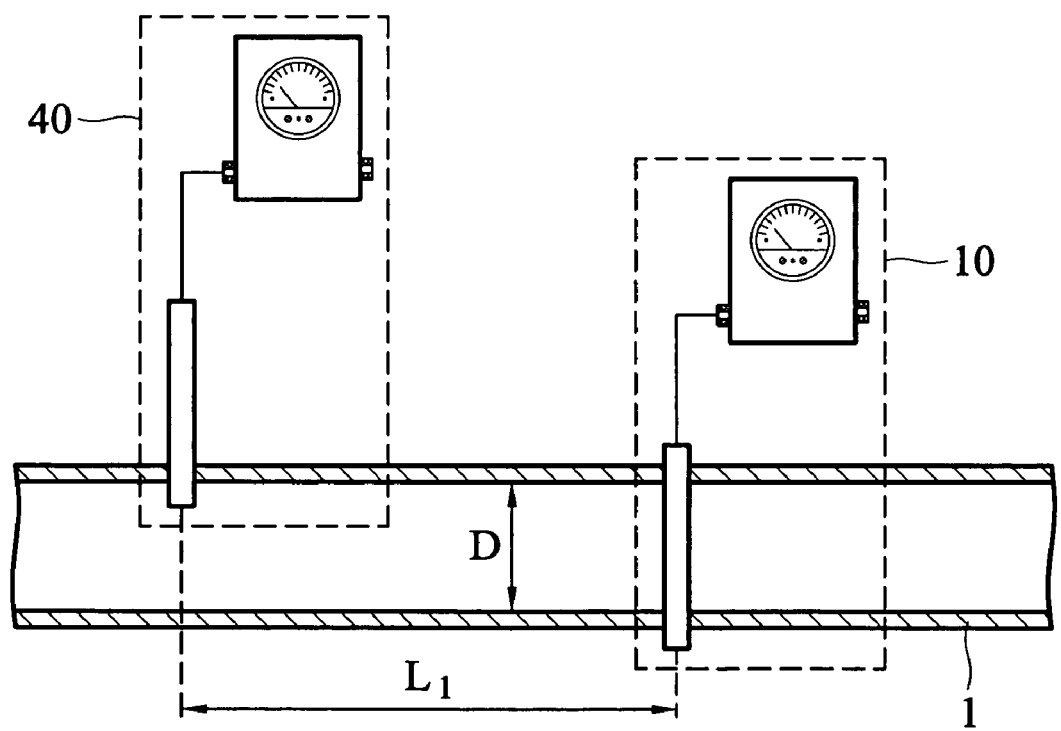
FIG. 6 shows a pipe to be measured in a modified embodiment of the invention.

Though the invention is utilized in measuring average velocity of simple pipe, other applications utilizing the measurement method of the invention are also involved in the scope thereof. As shown in FIG. 6, the invention can also obtain a total pressure at a first location by the total pressure measuring device 10, and an end static pressure at a second location by a static pressure measuring device 40. Then, the average velocity pressure between the first location and the second location is obtained by the method of the invention. For example, with reference to FIG. 6, the distance between the first location and the second location is $L_1$, the diameter of the pipe is D, the total pressure TP and the end static pressure are obtained. Thus, the average velocity pressure is obtained according to the first formula and the second formula:

$$\Delta SP \approx C_1 \times \frac{L_1}{D^{C_2}} \times VP \quad (1)$$

$$VP = TP - SP \quad (2)$$

In the embodiment of FIG. 6, the second location is not at the outlet. Thus, the end static pressure is not equal to 0 and the static pressure SP equals the static pressure drop $\Delta SP$ adding the end static pressure.

The invention discloses a method for measuring average velocity pressure in a straight circular pipe and an L-shaped circular pipe. The application of the invention is, however, not limited. Any pipe structure which has reasonable measurement formula is within the scope of the invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A method for measuring an average velocity pressure of a pipe, comprising:
   providing a total pressure measuring device;
   obtaining a total pressure through the total pressure measuring device disposed at a first location in the pipe;
   measuring at least one physical parameter between the first location and an outlet of the pipe;
   obtaining a formula of a static pressure and the average velocity pressure between the outlet and the first location by comparing the physical parameter to known fluid mechanics data;
   obtaining the average velocity pressure from the formula and the total pressure; and
   wherein the said physical parameters comprise a diameter of the pipe and a shape of the pipe.

2. The method as claimed in claim 1, wherein the total pressure measuring device comprises a total pressure tube, a soft tube and a manometer, the total pressure tube is disposed at the first location, the soft tube is connected between the total pressure tube and the manometer, and the manometer obtains the total pressure by subtracting a measured pressure from an atmospheric pressure.

3. The method as claimed in claim 1, wherein when the pipe is a straight circular pipe, the physical parameters further comprise a distance between the first location and the outlet.

4. The method as claimed in claim 3, wherein the formula is equivalent to a first formula:

$$\Delta SP \approx C_1 \times \frac{L_1}{D^{C_2}} \times VP$$

wherein, $\Delta SP$ is a static pressure drop, VP is the average velocity pressure, L1 is a distance between the first location and the outlet, D is a diameter of the pipe, C1 and C2 are constants obtained by comparing the physical parameters to known fluid mechanics data, and the L1 and D are obtained by measurement.

5. The method as claimed in claim 4, wherein the average velocity pressure is obtained incorporating the first formula into a second formula:

$$VP=TP-SP$$

wherein, TP is the total pressure, SP is the static pressure, and SP=$\Delta$SP.

6. The method as claimed in claim 1, wherein when the pipe is an L-shaped circular pipe comprising a first straight portion, an elbow portion and a second straight portion, the physical parameters further comprise a length of the first portion, a length of the second portion and a curvature radius of the elbow portion.

7. The method as claimed in claim 6, wherein the formula is equivalent to a third formula:

$$\Delta SP \approx K \times VP + C_1 \times \frac{L_1 + L_2}{D^{C_2}} \times VP$$

wherein, $\Delta SP$ is a static pressure drop, VP is the average velocity pressure, L1 is a length of the first straight portion, L2 is a length of the second straight portion, D is a diameter of the pipe, C1, C2, and K are constants obtained by comparing the physical parameters to known fluid mechanics data, and the L1, L2, and D are obtained by measurement.

8. The method as claimed in claim 7, wherein the average velocity pressure is obtained incorporating the third formula into a second formula:

$$VP=TP-SP$$

wherein, TP is the total pressure, SP is the static pressure, and SP=$\Delta$SP.

9. A method for measuring an average velocity pressure of a pipe, comprising:
providing a total pressure measuring device and a static pressure measuring device;
obtaining a total pressure through the total pressure measuring device disposed at a first location in the pipe;
obtaining an end static pressure through the static pressure measuring device disposed at a second location in the pipe;
measuring at least one physical parameter between the first location and the second location;
obtaining a formula of a static pressure drop and the average velocity pressure between the first location and the second location by comparing the physical parameter to known fluid mechanics data;
obtaining the average velocity pressure from the formula, the total pressure, the end static pressure and the static pressure drop; and
wherein the said physical parameters comprise a diameter of the pipe and a shape of the pipe.

10. The method as claimed in claim 9, wherein the total pressure measuring device comprises a total pressure tube, a soft tube and a manometer, the total pressure tube is disposed at the first location, the soft tube is connected between the total pressure tube and the manometer, and the manometer obtains the total pressure by subtracting a measured pressure from an atmospheric pressure.

11. The method as claimed in claim 9, wherein when the pipe is a straight circular pipe, the physical parameters further comprise a distance between the first location and the second location.

12. The method as claimed in claim 11, wherein the formula is equivalent to a first formula:

$$\Delta SP \approx C_1 \times \frac{L_1}{D^{C_2}} \times VP$$

wherein, $\Delta SP$ is a static pressure drop, VP is the average velocity pressure, L1 is a distance between the first location and the second location, D is a diameter of the pipe, C1 and C2 are constants obtained by comparing the physical parameters to known fluid mechanics data, and the L1 and D are obtained by measurement.

13. The method as claimed in claim 12, wherein the average velocity pressure is obtained incorporating the first formula into a second formula:

$$VP=TP-SP$$

wherein, TP is the total pressure, SP is the static pressure, and the static pressure drop $\Delta$SP adds the end static pressure equal to the static pressure SP.

14. The method as claimed in claim 9, wherein when the pipe is an L-shaped circular pipe comprising a first straight portion, an elbow portion and a second straight portion, the physical parameters further comprise a length of the first portion, a length of the second portion and a curvature radius of the elbow portion.

15. The method as claimed in claim 14, wherein the formula is equivalent to a third formula:

$$\Delta SP \approx K \times VP + C_1 \times \frac{L_1 + L_2}{D^{C_2}} \times VP$$

wherein, $\Delta SP$ is a static pressure drop, VP is the average velocity pressure, L1 is a length of the first straight portion, L2 is a length of the second straight portion, D is a diameter of the pipe, C1, C2, and K are constants obtained by comparing the physical parameters to known fluid mechanics data, and the L1, L2, and D are obtained by measurement.

16. The method as claimed in claim 15, wherein the average velocity pressure is obtained incorporating the third formula into a second formula:

$$VP = TP - SP$$

wherein, TP is the total pressure, SP is the static pressure, and the static pressure drop ΔSP adds the end static pressure equal to the static pressure SP.

17. A pressure measuring system for measuring an average velocity pressure between a first location and an outlet of a pipe, comprising:
- a total pressure measuring device, disposed at the first location in the pipe obtaining a total pressure;
- a processor, coupled to the total pressure measuring device and obtaining the average velocity pressure according to the total pressure and at least one physical parameter between the first location and the outlet;
- an output device, coupled to the processor and outputting the average velocity pressure; and
- wherein the said physical parameters comprise a diameter of the pipe and a shape of the pipe.

18. The pressure measuring system as claimed in claim 17, wherein the total pressure measuring device comprises a total pressure tube, a soft tube and a manometer, the total pressure tube is disposed at the first location, the soft tube is connected between the total pressure tube and the manometer, and the manometer obtains the total pressure by subtracting a measured pressure from an atmospheric pressure.

19. A method for measuring an average velocity pressure of a pipe, comprising:
- providing a total pressure measuring device;
- obtaining a total pressure through the total pressure measuring device disposed at a first location in the pipe;
- measuring at least one physical parameter between the first location and an outlet of the pipe;
- obtaining a formula of the total pressure and the average velocity pressure between the outlet and the first location by comparing the physical parameter to known fluid mechanics data;
- obtaining the average velocity pressure from the formula; and
- wherein the said physical parameters comprise a diameter of the pipe and a shape of the pipe.

20. The method as claimed in claim 19, wherein when the pipe is a straight circular pipe, the formula is equivalent to a fourth formula:

$$VP \approx \left[ \frac{1}{1 + C_1 \times L_1 / D^{C_2}} \right] \times TP$$

wherein, TP is the total pressure, VP is the average velocity pressure, L1 is a distance between the first location and the outlet, D is a diameter of the pipe, C1 and C2 are constants obtained by comparing the L1 and D to known fluid mechanics data, and the L1 and D are obtained by measurement.

21. The method as claimed in claim 19, wherein when the pipe is an L-shaped circular pipe comprising a first straight portion, an elbow portion and a second straight portion, the formula is equivalent to a fifth formula:

$$VP \approx \left[ \frac{1}{1 + K + C_1 \times (L_1 + L_2) / D^{C_2}} \right] \times TP$$

wherein, TP is the total pressure, VP is the average velocity pressure, L1 is a length of the first straight portion, L2 is a length of the second straight portion, D is a diameter of the pipe, C1, C2, and K are constants obtained by comparing the L1, L2, D, and a curvature radius of the elbow portion to known fluid mechanics data, and the L1, L2, D, and curvature radius of the elbow portion are obtained by measurement.

* * * * *